United States Patent [19]

Amancharla

[11] 4,234,197
[45] Nov. 18, 1980

[54] CONDUIT SEALING SYSTEM

[75] Inventor: Amareswar Amancharla, League City, Roger A. Weinberg, Houston, both of Tex.

[73] Assignee: Baker International Corporation, Orange, Calif.

[21] Appl. No.: 4,786

[22] Filed: Jan. 19, 1979

[51] Int. Cl.³ .................... F16J 15/18; F21B 23/00
[52] U.S. Cl. .................... 277/124; 277/125; 277/188 A; 277/DIG. 6; 166/196
[58] Field of Search ............... 277/DIG. 6, 104, 110, 277/123–125, 188 A, 111, 121, 116.4, 116.8; 166/134, 179, 191, 196

[56] References Cited

U.S. PATENT DOCUMENTS

| | | | |
|---|---|---|---|
| 2,527,225 | 10/1950 | Langstaff et al. | 277/111 X |
| 2,612,953 | 10/1952 | Morgan et al. | 277/116.4 |
| 3,059,699 | 10/1962 | Brown | 277/116.4 X |
| 3,554,280 | 1/1971 | Tucker | 166/196 X |
| 3,907,307 | 9/1975 | Maurer et al. | 277/124 X |
| 4,050,701 | 9/1977 | Webb | 277/125 |
| 4,169,605 | 10/1979 | Nishimoto et al. | 277/188 A |

FOREIGN PATENT DOCUMENTS

| | | | |
|---|---|---|---|
| 2412698 | 9/1975 | Fed. Rep. of Germany | 277/124 |
| 295933 | 2/1971 | U.S.S.R. | 277/125 |

*Primary Examiner*—Robert S. Ward, Jr.
*Attorney, Agent, or Firm*—William G. Norvell, Jr.

[57] ABSTRACT

A seal system is provided with a series of annular seal assemblies separated by relatively rigid spacing members and may be preferably adapted to selectively sealing engage a packer apparatus within a well bore conduit, during the completion or workover of a subterranean oil or gas well. Preferably, each seal assembly comprises four annular seal members in sequence. The outermost seal members are formed from a thermoplastic polymer having a coefficient of expansion greater than that of the rigid spacing members and the conduit, with physical resistance to corrosive chemicals and high temperature and pressure environments. The outermost member has a physical hardness sufficient to withstand extrusion into a gap defined between the rigid spacing member and the conduit by pressure transmitted from the rigid spacing member. One of the inner seal members is a flexible perfluoro polymer with enhanced permanent set and cold flow. The second of the inner seal members is an elastomer derived from the copolymerization of tetrafluoroethylene and perfluoroethers.

9 Claims, 6 Drawing Figures

U.S. Patent    Nov. 18, 1980    4,234,197
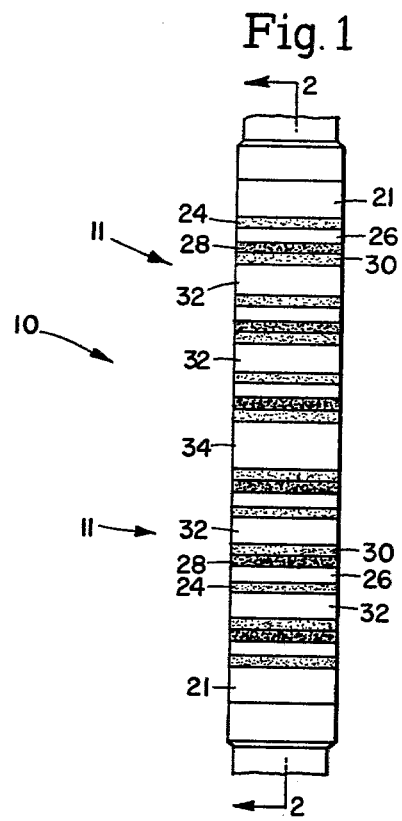
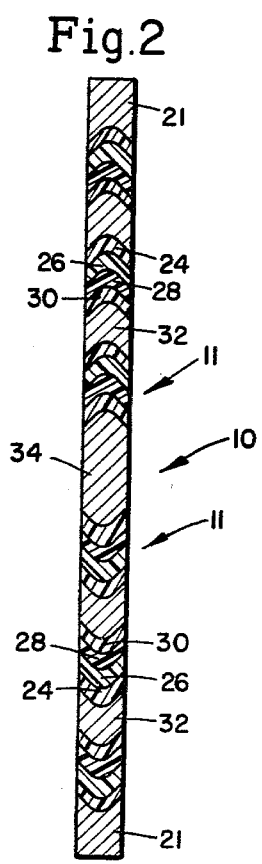
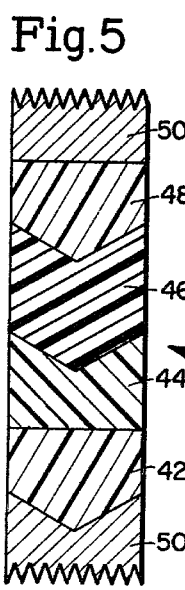
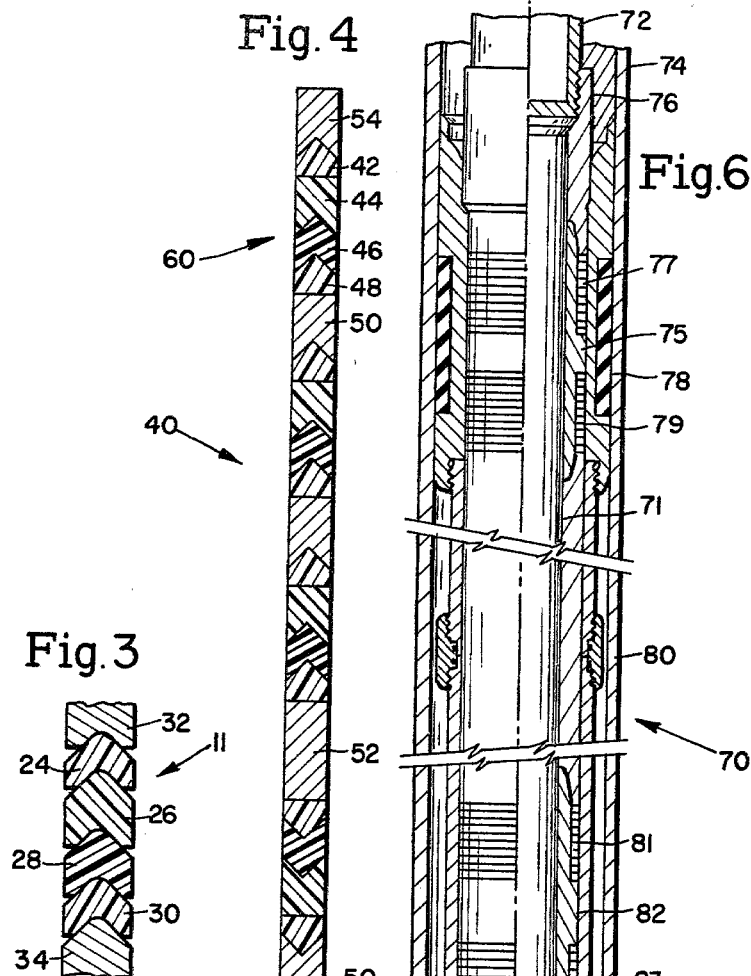
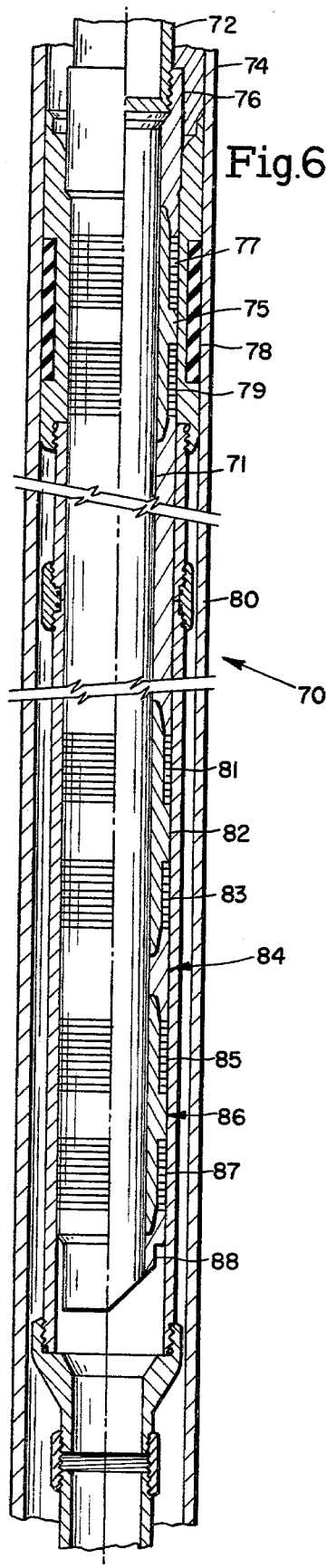

CONDUIT SEALING SYSTEM

BACKGROUND OF THE INVENTION

1. Field of the Invention

This invention relates to an improved seal system designed for particular use in completion and production operations of oil and gas wells wherein the seal system greatly reduces the tendency and incidence of seal seizure or sticking.

2. Description of the Prior Art

Movement of tubing within the sealing bores of packers, bridge plugs, and the like, during completion and production operations in high pressure, high temperature oil and gas wells has been a major cause of damage to seal systems and subsequent diminished performance and sealing integrity of such seal systems. Damage to the seal systems has become a greater problem during the present intensive search for new oil and gas reserves, wherein the drilling and subsequent completion is in deeper wells, involving exposure in extremely hostile high temperature, high pressure environments wherein the well production may contain a significant amount of hydrogen sulfide, carbon dioxide and methane.

To overcome these conditions and thus successfully complete such a well, the seal system must have continuous sealing integrity. The seal system must be resistant not only to the damaging effects of the well environment (i.e., temperature, pressure, fluids) but also to the physical stresses imposed by or resulting from completion or workover techniques, i.e., unrestrained tubing movement, build up of corrosive products in the sealing annular area, and the like. Typical of prior art seal systems is U.S. Pat. No. 2,862,563, illustrating a well packer assembly for packing the annular space between tubing in a well, wherein resilient annular packing elements are spaced about a tubular mandrel. U.S. Pat. No. 3,083,775 teaches the use of a formation packer wherein a plurality of resilient annular packing elements are spaced about a tubular mandrel and a plurality of folded metal plates which are set on a double traveling mandrel. U.S. Pat. No. 3,531,236 discloses a tubular sealing assembly having chevron sealing rings formed from a fluoroelastomer and asbestos, with fluorocarbon plastic ring adaptors at each end of the seal stack. U.S. Pat. No. 2,467,822 teaches the use of a rubber or similar packing material which is prevented from flowing through the opening between the packer body and the packing retainer or abutment surrounding the body.

The prior art also shows a number of generic seal systems which may have utility in the sealing of a well conduit. For example, U.S. Pat. No. 3,467,394 shows a packing means of a V-ring type wherein the packing arrangement comprises a polytetrafluoroethylene, commonly marketed under the trademark TEFLON, with relatively rigid V-ring shaped spacer rings interposed between a plurality of the elastomeric V-rings. Additionally, U.S. Pat. No. 4,050,701 shows ring seals obtained from a mixture of polyphenylene sulfide and polytetrafluoroethylene, for use in the fluid sealing of rotary and/or reciprocating shafts. Similarly, U.S. Pat. No. 3,626,337 discloses a packing ring for use in high temperatures and pressure environments wherein a thermoplastic type composition, such as rubberized Nylon, tetrafluoroethylene, polyesters, acrylics, and the like, are laminated to form the final seal substance. U.S. Pat. No. 3,799,454, discloses a coating composition containing polytetrafluoroethylene and polyenylene sulfide for formation of a seal system.

Generally, the seal systems of the prior art have not been totally suitable for use in wells having high bottom hole temperature and pressures and corrosive fluids, and have also been found to be deficient when exposed to even less severe environments.

To overcome these deficiencies it has been suggested that various new elastomeric type materials be used in the sealing systems. A report of the 52nd Annual Fall Technical Conference and Exhibition of the Society of Petroleum Engineers, Oct. 9–12, 1977 discusses the testing of a number of the various new elastomeric type materials in relation to their use in packer seal systems. This Report No. SPE 6762 discloses the use of three particular elastomeric type materials which can be utilized in packer seal systems. These elastomeric materials are commonly sold under the trademarks of TEFLON, a polymer of tetrafluoroethylene, RYTON, a polymer of polyphenylene sulfide, and KALREZ, a perfluoroelastomer.

Polytetrafluoroethylene, sold under the DuPont trademark TEFLON, is a flexible fluoropolymer having a high degree of permanent set and cold flow. It also has a high resistance to corrosive chemicals and high temperatures. It can be used as virgin TEFLON or it may be filled with a suitable filler, i.e., glass particles.

Polyphenylene sulfide resin, sold under the trademark RYTON by Phillips Petroleum Company, is a thermoplastic resin characterized by a high thermal stability, excellent chemical resistance, and a high affinity for fillers. The resin may be the reaction product of p-dichlorobenzene and sodium sulfide in a polar solvent, as disclosed in U.S. Pat. No. 3,354,129.

The perflouroelastomer, sold under the trademark KALREZ by DuPont, is a material characterized by high thermal stability and excellent chemical resistance. Exemplary of such perfluoroelastomers is the reaction product of perfluoro(3-phenoxypropylvinyl ether) and at least one fluorine-containing ethylenically unsaturated monomer, as fully disclosed in U.S. Pat. No. 3,682,872.

The above described elastomeric materials have been used in packer seal systems, but not with complete success. It has been found that seal systems which incorporate these elastomeric materials have a strong tendency to adhere or stick to the conduit when the seal system must be retrieved from the well.

These problems were found to be particularly prevalent in a commercially available seal system incorporating elastomeric materials wherein the seal system comprised six seal assemblies with each seal assembly, in turn, comprising, in order, a KALREZ seal unit, a 25% glass-filled TEFLON seal unit, and a RYTON seal unit. Each seal assembly was separated by rigid metallic spacing members abutting a seal unit comprising either KALREZ or RYTON. For testing purposes, this seal system was incorporated into a packer wherein the rigid spacing member abutted the KALREZ seal unit. Pressure was thereafter applied to the seal system. The spacing member transmitted the applied pressure to the seal assembly and the seal assembly transmitted the pressure induced upon it to the other adjacent seal assemblies. It was found that the seal assemblies held satisfactorily under the transmitted pressure; however, the KALREZ seal unit "flowed" back over the abutting metal spacers. This backward flow not only destroyed the elastomeric seal unit, but it caused extremely high frictional forces which, in turn, caused sticking that would resist subsequent retrieval of the well packer and the seal system.

The sticking of the seal system can occur when there are multiple seal assemblies wherein the upper seal assembly holds, and thus the lower seal assembly receives only the mechanical load and not the hydraulic pressure of the seal system. The mechanical load will cause the elastomer, i.e., the KALREZ, to extrude in both directions, i.e., the direction from high to low pressure and also in the direction of high pressure itself. The metal spacer adjacent the elastomeric material acts like a hydraulic ram and the elastomer can extrude back over the spacer as the mechanical load acts upon it. This action causes the seal system to have a high friction-to-movement and it is this friction, as hereinbefore mentioned, which causes the seal system to stick, i.e., to resist subsequent retrieval. This obviously may cause severe damage to the seal system.

The present invention relates to an improved seal system which greatly reduces sticking and enables the packer, bridge plug or the like, together with the seal system to be more easily retrieved. The present invention is also designed to greatly reduce the seal damage associated with seal systems incorporating elastomeric materials in hostile physical environments in a well.

The reduction in sticking and seal damage is accomplished in accordance with this invention by providing a seal assembly which prevents the elastomer from extruding back over the adjacent rigid spacing member. The sealing system is characterized by its ability to withstand hostile environments in wells which have high pressures and temperatures, corrosive chemicals, etc. The system also withstands dynamic tube movement of the packer and minimizes sticking problems due to extrusion of elastomers of the seal members into the gap between the seal bore and spacing members.

It is an object of the invention to provide a seal system usable on a conduit as a permanent seal system in the completion of and production from, corrosive, high pressure, high temperature wells.

It is another object of the invention to provide a seal system which reduces seal damage caused by movement of the associated conduit in the bore of an oil or gas well during completion and production operations.

It is another object of the invention to provide a seal system which reduces the tendency of a seal system to stick to a conduit during retrieval of the seal system.

Other objects of the invention will be apparent from the following description.

SUMMARY OF THE INVENTION

A seal system adaptable to a well conduit comprises a series of annular seal assemblies, each seal assembly being separated by a rigid spacing member. The seal assemblies preferably are composed of four sequential annular seal members with the outermost seal member comprising a polymer having a coefficient of expansion greater than that of the rigid spacing member and a well conduit and a hardness sufficient to withstand extrusion into the gap between the spacing member and a well conduit. One of the inner seal members comprises a flexible perfluoro polymer having a high degree of permanent set and cold flow. The other of the inner seal members comprises the elastomeric reaction product of the copolymerization of the tetrafluoroethylene and perfluoroethers.

BRIEF DESCRIPTION OF THE DRAWINGS

FIG. 1 is a fragmentary side view of the seal system of the present invention.

FIG. 2 is a vertical cross-section taken along line 2—2 of FIG. 1 showing one embodiment of the seal system.

FIG. 3 is an enlarged portion of the seal system shown in FIG. 2.

FIG. 4 is a fragmentary vertical cross-section through a seal system, similar as in FIG. 2, showing a second embodiment of the seal system.

FIG. 5 is an enlarged portion of the seal system shown in FIG. 4.

FIG. 6 is a partially sectionalized elevational view of a packer showing four lower seal systems and two upper seal systems below the locator.

DESCRIPTION OF THE PREFERRED EMBODIMENTS

The seal assembly of the present invention comprises four seal units or members in a sequential layered arrangement wherein each seal assembly is separated by hard, rigid, members comprising plastic or metal.

The outer (or upper and lower) two seal units comprise a thermoplastic resin material which is greater than that of the rigid member which it abuts, and which is also greater than the coefficient of expansion of the associated conduit for sealing in the well bore. In addition, the resin material has a high resistance to corrosive chemicals, high temperatures and has a property of machinability to very close tolerances. The resin material has a physical strength sufficient to prevent its extrusion into the gap between the rigid spacing member and well conduit. Preferably, the resin is a polymer of polyphenylene sulfide presently commercially available under the trademark RYTON from Phillips Petroleum Company, and as disclosed in U.S. Pat. No. 3,324,078, the disclosure of which is incorporated herein by reference.

The inner two seal units or members are disposed between the outer seal units. One unit comprises a polytetrafluoroethylene polymer and the second unit comprises an elastomer comprising the reaction product of tetrafluoroethylene and perfluoro ethers.

The first of the two inner seal units is the polymeric reaction product of tetrafluoroethylene which is a flexible material having a high degree of permanent set and cold flow, resistance to high temperatures, corrosive chemicals, etc. The product is available commercially as TEFLON, a registered trademark of DuPont and Company.

The other of the two inner seal units is made from an elastomer comprising the copolymerization reaction product of tetrafluoroethylene and perfluoro ethers. The ethers can be perfluoro (methylvinyl ether) and a perfluorovinyl ether. The material when cross-linked gives vulcanizates with outstanding chemical and fluid resistance and high temperature oxidative resistance. These elastomers are typified by the disclosure in U.S. Pat. No. 3,682,872 incorporated herein by reference. A typical elastomer made in accordance with the teachings of this patent is commercially available under the trademark KALREZ from DuPont and Company.

Referring now to FIG. 1, one embodiment of the seal system 10 comprises a number of seal assemblies 11, each of which comprises seal units 24, 26, 28 and 30 wherein each seal assembly 11 is separated from adjacent assemblies by rigid spacing members 32. Seal system 10 comprises six seal assemblies 11, with each assembly having four rigid spacing members 32, one rigid center spacing member 34, and two rigid end members 21. The seal system 10 can comprise more or less of the seal assemblies and rigid members as may be required for the particular application of the seal system and affixation onto a packer or bridge plug outer housing, or other sealing conduit extendable into a well bore.

Each seal assembly 11 comprises the four seal units and, as shown, the outer seal units 24 and 30 comprise a thermoplastic resin material, such as the RYTON material.

The inner seal unit 26 comprises a polytetrafluoroethylene such as the TEFLON material and preferably a 25% glass-filled TEFLON. The other inner seal unit 28 is the elastomeric reaction product of the polymerization of tetrafluoroethylene and perfluoro ethers, such as the KALREZ material.

FIGS. 2 and 3 show one embodiment of seal system 10 and show the layered arrangement of seal assemblies 11 wherein the seal units 24, 26, 28 and 30 have a chevron shape, and wherein each seal assembly 11 comprises four chevron units. As used herein a chevron unit is a seal unit in the form of a ring having a V-shaped cross-section.

The sealing system 10 comprises six seal assemblies 11 arranged in layers as shown in FIG. 2. The seal system is designed with three seal assemblies 11 positioned with the chevrons facing upwardly and three seal assemblies 11 positioned with the chevrons facing downwardly and the concave surfaces opposed. This arrangement as shown in FIG. 2. Seal units 48 and 42 are each a ring member having an inner cylindrical surface and an outer V-shaped chevron surface. Seal units 48 and 42 can abut rigid spacing member 50, center spacing member 42, or end member 54. Upper seal unit 44 comprises a ring member having an outer cylindrical surface and an inner inverted V-shaped chevron surface. Seal unit 46 also is in the form of a chevron. Rigid members 50 and 54 have the same chevron shape as seal unit 44. Center spacing member 52 is a conventional cylindrical ring The layered arrangement of the shaped seal units and spacers shown in FIGS. 4 and 5 is also suitable for use as a sealing system contemplated by this inventor.

Several tests were conducted to determine the effectiveness of the seal systems of the invention. Table 1 shows the results of a series of tests run on the seal systems of the invention and one test run on a seal system of the prior art. The seal system of Test 1 (prior art) comprised six sealing assemblies separated by rigid spacing members wherein three chevron units were positioned with V-shaped portion facing upwardly and three seal units positioned with their V-shaped portions facing downwardly. Test 1 resulted in severe sticking of the seal system and the KALREZ seal extruded over the rigid spacing member into the seal bore. In contrast, in Tests 2, 3 and 4, the seal systems of the invention had no seal damage when the seal systems were retrieved from the test well.

The results of this test are set forth below in Table 1:

TABLE 1

| Test Number | Type of Test | Description of Seals used in Test | Arrangement of Seals | Temperature | Results of Test |
|---|---|---|---|---|---|
| 1 | Temperature cycled static test in methane with 10,000 PSI differential | Kalrez, Teflon, 25% glass filled and Ryton, 3 layer arrangement (prior art) | Kalrez, 25% glass filled Teflon, Ryton | 2 cycles from 300° to 150° F. | Severe Extrustion of Kalrez toward the high pressure (upstream) side. Removal of seals was very difficult no leakage. |
| 2 | 40 cycles, non-unload Dynamic test in #2 diesel with 5000 PSI differential and 4"stroke | Ryton, Kalrez, 25% glass filled Teflon, and Ryton. 4 layer arrangement (Shown in FIGS. 2 and 3) | The arrangement of FIG. 2: Ryton, Kalrez, 25% glass-filled Teflon, and Ryton. | 350° F. | No Seal Damage. No Leakage. No Kalrez Extrusion Excellent overall appearance. |
| 3 | 24 hr. static test in methane with 10,000 PSI differential | Ryton, Kalrez, 25% glass-filled Teflon, and Ryton. 4 layer arrangement (Shown in FIGS. 4 and 5) | The arrangement of FIG. 3: Ryton, Kalrez, 25% glass-filled Teflon, and Ryton | 350° F. | No Seal Damage. No Leakage Seals were removed fairly easily. Excellent overall appearance. |
| 4 | 40 cycles, non-unloaded dynamic test in #2 diesel with 5000 PSI differential and 4" stroke | Ryton, Kalrez, 25% glass-filled Teflon, and Ryton. 4 layer arrangement (Shown in FIGS. 4 and 5) | The arrangement of FIG. 3: Ryton, Kalrez, 25% glass-filled Teflon, and Ryton | 350° F. | No Seal Damage No Leakage Excellent overall appearance. | provides an anchoring action when upstream pressure is applied at rigid end member 21. The V-type chevron seal units 24, 26, 28 and 30 are of a general design whereby the resilient forces produced by the compression of the elastomeric materials in the seal assemblies provide an extremely tight fluid seal.

A second embodiment of the seal system of the invention is shown in FIGS. 4 and 5 by the numeral 40 in FIG. 4, wherein the seal assembly 60 comprises the same layered arrangement of seal units 42, 44, 46 and 48, FIG. 6 shows a packer 70 for completing an oil or gas well using a series of seal systems 77, 79, 81, 83, 85 and 87. The packer 70 comprises four systems 81, 83, 85 and 87, suitably spaced at the lower end of seal bore extension 71 and two seal systems 77 and 79 on a locator 76. Sealing systems 81, 83, 85 and 87, referred to as the working seals, are spaced down in the seal bore extension low enough so that they do not exit the bore during treatment of the well, i.e., stimulation. The two seal systems 77 and 79 just below the locator 76 will seal in the bore of the packer 78 and prevent debris from entering the seal bore 80. The seal systems 77, 79, 81, 83, 85 and 87 are secured on seal sub means 75, 82, and 86, and seal hub means 82 and 86 are secured by seal connecting means 84, wherein the seal sub means and seal connecting means are provided with threads. Seal sub means 86 is secured at the lower end by the threaded half mule shoe guide 88.

The seal system 77 and 79 are secured on the locator 76, wherein the locator 76 and the seal systems 77 and 79 are used with a production packer 78 having two seal bore extensions 71 received in the bore thereof.

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and is desired to be secured by Letters Patent is:

1. In a seal system carriable by a first conduit and sealingly engageable with a second conduit within a well bore for isolating an annular section between said conduits, the improvement comprising: a plurality of longitudinally extending, selectively spaced annular seal assemblies, each of said assemblies being separated one from another by a rigid spacing member, each of said assemblies comprising a plurality of annular seal members wherein each of the outermost seal members adjacent to the spacing member have a coefficient of expansion greater than that of the rigid spacing member and said second conduit and wherein each of the outermost seal members is not extrudable over said rigid spacing member during sealing engagement between the conduits.

2. The improvement of claim 1 wherein each of the outermost seal members comprises polyphenylene sulfide.

3. The improvement of claim 1 wherein each of said outermost seal members are chevron-shaped and said spacing members are companionally chevron-shaped.

4. A seal system carriable by a first conduit and sealingly engageable with a second conduit within a well bore for isolating an annular section between said conduits, comprising: a plurality of longitudinally extending, selectively spaced annular seal assemblies, each of said assemblies being separated one from another by a rigid spacing member, each of said assemblies comprising four sequential annular seal members wherein each of the outermost seal members have a coefficient of expansion greater than that of the rigid spacing member and said second conduit and wherein each of the outermost seal members is not extrudable over said rigid spacing member during sealing engagement between the conduits, one of the inner seal members comprises a polymer of tetrafluoroethylene, and another of the inner seal members comprises an elastomer of the copolymerization of tetrafluoroethylene and perfluoro ethers.

5. The seal system of claim 4 wherein said another of the inner seal members comprises an elastomer of the copolymerization of tetrafluoroethylene, perfluoro(methyl vinyl ether) and perfluorovinyl ether.

6. The seal system of claim 4 wherein each of said outermost seal members are chevron-shaped and said spacing members are companionly chevron-shaped.

7. The seal system of claim 4 wherein each of said outermost seal members have an inner cylindrical surface and an outer V-shaped chevron-shaped surface, one of said inner seal members is a ring member having an outer cylindrical surface and an inner V-shaped chevron surface, and the outer of said inner seal members is chevron-shaped.

8. The seal system of claim 4 wherein each of the outermost seal members comprises polyphenylene sulfide.

9. In a seal system carriable by a first conduit and sealingly engageable with a second conduit within a well bore for isolating an annular section between said conduits, the improvement comprising: a grooveway housing exteriorly defined at least partially around said first conduit; at least one longitudinally extending annular seal assembly within said housing comprising a plurality of annular seal members wherein each of the outermost seal members has a coefficient of expansion greater than that of the grooveway housing and said second conduit, and wherein each of the outermost seal members is not extrudable over said grooveway housing during sealing engagement between the conduits.

* * * * *